July 22, 1952  W. E. DERBY  2,604,130
DETACHABLE HANDLE SAW
Filed Oct. 6, 1949
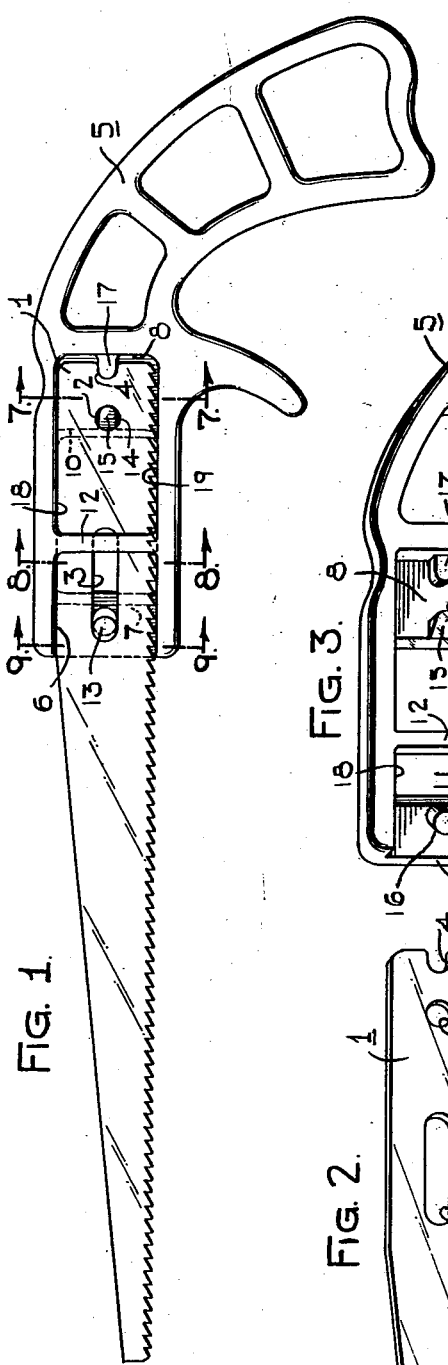
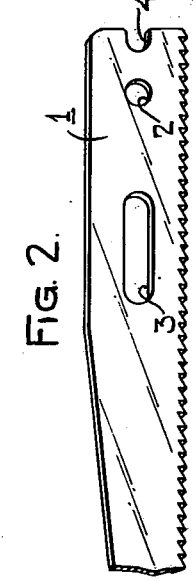
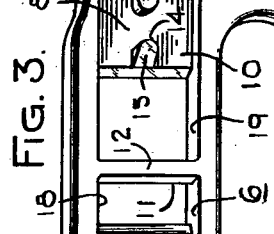
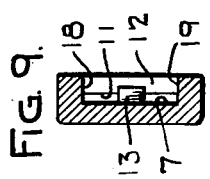
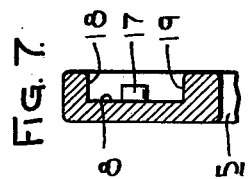
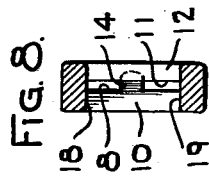
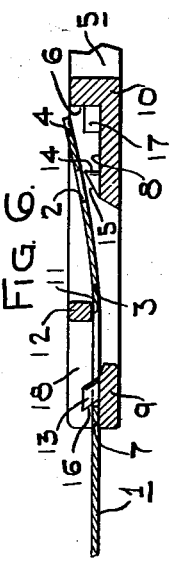
Inventor:
William E. Derby
by his Attorneys
Howson & Howson Patented July 22, 1952

2,604,130

UNITED STATES PATENT OFFICE 2,604,130

DETACHABLE HANDLE SAW

William E. Derby, Philadelphia, Pa., assignor to Henry Disston and Sons, Inc., Philadelphia, Pa., a corporation of Pennsylvania Application October 6, 1949, Serial No. 119,847

2 Claims. (Cl. 145—31)

This invention relates to improvements in saws, primarily of the compass type, wherein provision is made for replacing the blade in the handle or holder.

A primary object of the invention is to provide a detachable blade and holder assembly of generally improved characteristics.

More particularly an object of the invention is to provide a saw of the stated type having improved means for detachably retaining the blade in the holder whereby substantially all looseness or play between the blade and the holder is eliminated.

Another object of the invention is to provide an assembly of the character set forth in the preceding paragraph wherein the blade may be conveniently inserted and detached from the holder without the use of tools.

The invention will be more readily understood by reference to the attached drawings wherein:

Fig. 1 is a side view of a saw made in accordance with the invention;

Fig. 2 is a fragmentary view in perspective of the saw blade;

Fig. 3 is a view in perspective of the blade holder;

Figs. 4, 5 and 6 are fragmentary longitudinal sectional views illustrating various stages in the engagement and disengagement of the blade with and from the holder; and Figs. 7, 8 and 9 are sectional views on the lines 7—7, 8—8 and 9—9, respectively, of Fig. 1.

With reference to the drawings, the particular blade therein illustrated has at one end a substantially rectangular base portion 1 having therein two longitudinally aligned apertures, 2 and 3 respectively, relatively spaced longitudinally of the blade, and, also aligned with the apertures 2 and 3, a recess 4 in the terminal end edge of the base portion 1.

The blade holder 5, as shown in Fig. 3, is in the form in the present instance of a pistol-grip handle and has therein a slot like recess, designated generally by the reference numeral 6, for reception of the butt end 1 of the saw blade, said recess being proportioned to closely fit the butt so that the blade may be rigidly supported in the holder.

The slotted recess 6 is formed so that in assembling the blade in the holder the butt of the blade is inserted endwise. One side of the recess is defined by the surfaces 7 and 8 of relatively spaced portions 9 and 10, respectively, of the holder, said surfaces being in a common plane and forming a seat for one face of the butt 1 of the blade. The other side of the recess is defined by the surface 11 of a transverse portion 12 of the holder, said portion in the present instance being located intermediately of the portions 9 and 10 and being arranged with respect to the latter portions so that the surface 11 is off-set from the common plane of the surfaces 7 and 8 to an extent corresponding substantially to the thickness of the blade as measured between the opposite faces of the latter.

Projecting from the surface 7 is a pin 13 which, in assembly, engages in the elongated aperture 3 of the blade; and a second pin 14 projects similarly from the surface 8 of the portion 10 of the holder and in assembly is engaged with the blade aperture 2. It will be noted that the side of the pin 14 which faces the open end of the recess 6, i. e., the end through which the blade is inserted and withdrawn, is inclined rearwardly from the common plane of the surfaces 7 and 8, this inclined surface of the pin being designated by the reference numeral 15. It will be noted also that the side of the pin 13 which confronts the open end of the recess 6 is inclined in the opposite direction so that this forward side of the pin 13 is in effect undercut, as illustrated at 16, Fig. 4. It is noted also that the holder is provided in the inner end of the recess 6 with a projecting lug 17 which in assembly is adapted to engage in and to more or less neatly fit the recess 4 of the blade.

In transverse dimensions that is the dimension between the sides 18 and 19 of the recess 6 the said recess conforms closely to the corresponding dimension of the butt portion 1 of the blade so that when the blade is inserted in the recess it fits nicely between the sides 18 and 19 of the recess.

In inserting the blade into the holder, the butt end thereof is inserted diagonally downward into the open end of the recess 6 between the transverse portions 9 and 12 of the holder to a position wherein pin 13 engages the rear portion of slot 3 in the blade, as illustrated in Figure 4. The blade is then adjusted angularly until the face of the blade lies flatly against the surface 7 of the portion 9 and surface 11 of the portion 12 as shown in broken lines in Figure 4. The position of slot 3 in relation to the terminal end of the blade is such that in this adjustment the terminal end of the blade clears the forward edge of portion 10. In this position the terminal end of the butt portion of the blade will confront the inclined surface 15 of the pin 14. Pressure is now exerted to force the blade inwardly of the recess thereby causing the inner end of the blade to slide up the inclined surface 15 of the pin 14, the blade flexing about the member 12. When the blade has advanced to the point where the pin 14 enters the aperture 2 the butt end of the blade will snap back to the position shown in Fig. 5 wherein it lies flatly against the surface 8 of the portion 10. In this position the boss 17 of the holder lies within the recess 4 in the inner edge of the blade, and the forward edge of the slot 3 lies under the overhang 16 of the pin 13. The blade is thus securely locked in place within the holder. The pin 14 prevents displacement of the blade toward the outer end of the slot. The boss 17 functions to prevent lateral movement of the blade in its own plane and relieves the pin 14 of that function, and the overhang of pin 13 prevents movement of the blade away from the seating surface 7. The transverse portion 12 overlying the blade also prevents any movement of the butt of the blade which might tend to free it from the pin 14.

While the blade is thus held rigidly and securely in place in the holder it may be removed readily by merely flexing the butt end of the blade away from the seating surface 8 to an extent, as illustrated in Fig. 6, freeing the pin 14 from the aperture 2. In this operation the member 12 of the holder acts as a fulcrum around which the flexure of the blade occurs. When thus freed from the pin 14 the blade may be removed from the holder by withdrawing it longitudinally from the recess 6 to the point where the butt end of the blade passes the forward edge of the portion 10 of the holder. The blade is then adjusted angularly disengaging slot 3 in the blade from pin 13 after which the blade may readily be withdrawn.

It will be noted that in this device the inclined forward side 15 of the pin 14 acts as a cam during the blade inserting operation to displace the inner butt end of the blade by flexure so as to permit longitudinal movement of the blade into the fully assembled position shown in Fig. 5. When thus fully seated lateral movement of the blade is positively precluded as described above as well as by the propinquity of the opposite longitudinal edges thereof with the side walls 18 and 19 of the recess 6.

I claim:

1. A tool comprising a resilient blade having two longitudinally-spaced apertures in one end portion thereof, a holder for said blade having an elongated recess open at its outer end to admit said end portion of the blade and having side walls confronting the respective side faces of the blade and spaced apart a distance to snugly embrace the said side faces and to confine the blade, said holder being provided internally of said recess with two pins projecting from one of said side walls and spaced longitudinally of the recess so that the said apertured end portion of the blade may fully occupy said recess unflexed only when the said pins have entered said apertures, said one side wall having an opening between said pins, and the opposite side wall comprising a transverse band, and having openings at opposite sides of said band, the openings of both side walls having a transverse width in excess of the transverse dimension of the said end portion of the blade, and said transverse band being positioned to engage the proximate side face of the blade intermediate the pins so as to afford a fulcrum about which the inner end portion of the blade may be flexed to admit the pin which adjoins the inner end of the holder recess to the corresponding aperture of the blade and to subsequently release the blade from said pin.

2. A tool according to claim 1 wherein the aperture of the blade which receives the pin which adjoins the outer end of the holder recess is elongated longitudinally of the blade to permit the longitudinal movement of the blade in the recess required for adjustment of the end portion of the blade after flexure into or out of operative relative with the inner pin.

WILLIAM E. DERBY.

REFERENCES CITED

The following references are of record in the file of this patent:

UNITED STATES PATENTS

| Number | Name | Date |
|---|---|---|
| 542,583 | Ball | July 9, 1895 |
| 2,016,107 | Frosberg | Oct. 1, 1935 |
| 2,017,895 | Davy | Oct. 22, 1935 |
| 2,137,800 | Davy | Nov. 22, 1938 |
| 2,149,241 | Davy | Feb. 28, 1939 |
| 2,282,902 | Sultan | May 12, 1942 |
| 2,361,256 | Barland | Oct. 24, 1944 |